(12) United States Patent
Hwang et al.

(10) Patent No.: US 7,298,804 B2
(45) Date of Patent: Nov. 20, 2007

(54) RECEIVING APPARATUS IN A RADIO COMMUNICATION SYSTEM USING AT LEAST THREE TRANSMITTER ANTENNAS

(75) Inventors: Chan-Soo Hwang, Yongin-shi (KR);
Seung-Hoon Nam, Seoul (KR);
Yung-Soo Kim, Songnam-shi (KR);
Jae-Hak Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 707 days.

(21) Appl. No.: 10/692,896

(22) Filed: Oct. 24, 2003

(65) Prior Publication Data

US 2004/0137864 A1    Jul. 15, 2004

(30) Foreign Application Priority Data

Jan. 9, 2003    (KR) .................... 10-2003-0001456

(51) Int. Cl.
*H04B 7/10*    (2006.01)
(52) U.S. Cl. .................................................. 375/347
(58) Field of Classification Search ................ 375/316, 375/329, 331, 332, 336, 347, 349
See application file for complete search history.

(56) References Cited

U.S. PATENT DOCUMENTS

| | | | |
|---|---|---|---|
| 6,678,263 B1 * | 1/2004 | Hammons et al. | 370/342 |
| 2002/0044591 A1 * | 4/2002 | Lee et al. | 375/130 |
| 2002/0101908 A1 * | 8/2002 | Kim et al. | 375/147 |
| 2003/0021355 A1 * | 1/2003 | You | 375/267 |
| 2003/0086479 A1 * | 5/2003 | Naguib | 375/144 |
| 2004/0120411 A1 * | 6/2004 | Walton et al. | 375/260 |

OTHER PUBLICATIONS

Hamid Jafarkhani, "A Quasi-Orthogonal Space-Time Block Code", IEEE Transactions on Communications, vol. 49, No. 1, pp. 1-4, Jan. 2001.
Vahid Tarokh et al. "Space Time Block Coding from Orthogonal Design", IEEE Trans. On Info., Theory, vol. 45, pp. 1456-1467, Jul. 1999.

(Continued)

*Primary Examiner*—Emmanuel Bayard
(74) *Attorney, Agent, or Firm*—The Farrell Law Firm (57) ABSTRACT

A receiver for receiving complex symbols in a radio communication system, in which a symbol arranger collects signals from at least three transmitter antennas through at least one receiver antenna over four time intervals; a channel estimator estimates at least three channel gains from the three transmitter antennas to the receiver antenna; first and second decoders each compute metrics for all possible pairs of symbols using the received signals and channel gains, and detect two symbols having a minimum metric; And a P/S (Parallel to Serial) converter arranges the detected symbols in the right order. Each decoder linearly operates the received signals and channel gains, pre-detects two symbols using threshold detection, and outputs the pre-detected symbols as final symbols if the product of the product of the pre-detected symbols and a constant determined by the channel gains is a minimum.

18 Claims, 5 Drawing Sheets

OTHER PUBLICATIONS

Siavash M. Alamouti "A Simple Transmitter Diversity Scheme for Wireless Communications", IEEE Journal on Selected Area in Communications, vol. 16, pp. 1451-1458, Oct. 1998.

Olav Tirkkonen et al., Minimal Non-Orthogonality Rate 1 Space-Time Block Code for 3+ Tx Antennas, IEEE 6th Symp. On Spread-Spectrum Tech. & Appli., NJIT, New Jersey, USA, Sep. 6-8, 2000.

Naresh Sharma et al., Improved Quasi-Orthogonal Codes Through Constellation Rotation, 2002.

Weifeng Su et al., Quasi-Orthogonal Space-Time Block Codes with Full Diversity, 2002.

* cited by examiner

$s_3$ $e^{j45°}s_1$ $e^{j-45°}s_1^*s_3$ $\text{Re}[e^{j-45°}s_1^*s_3]$

RECEIVING APPARATUS IN A RADIO COMMUNICATION SYSTEM USING AT LEAST THREE TRANSMITTER ANTENNAS

PRIORITY

This application claims priority under 35 U.S.C. § 119 to an application entitled "Receiving Apparatus in a Radio Communication System Using at Least Three Transmit Antennas" filed in the Korean Intellectual Property Office on Jan. 9, 2003 and assigned Ser. No. 2003-1456, the contents of which are herein incorporated by reference.

BACKGROUND OF THE INVENTION

1. Field of the Invention

The present invention relates generally to a radio communication system, and in particular, to an apparatus using transmitter antenna diversity to combat fading-caused degradation.

2. Description of the Related Art

An effective technique of relieving multi-path fading in a radio communication system is time and frequency diversity. Vahid Tarokh et al. has proposed a space-time block code. Space-time block codes are a well-known antenna diversity scheme disclosed in "Space Time Block Coding from Orthogonal Design", IEEE Trans. On Info., Theory, Vol. 45, pp. 1456-1467, July 1999. Tarokh's space-time block code is an extension of transmitter antenna diversity as introduced by S. M. Alamouti, which allows use of two or more antennas. Tarokh's space-time block code is disclosed in "Space Time Block Coding from Orthogonal Design", IEEE Trans. On Info., Theory, Vol. 45, pp. 1456-1467, July 1999, and Alamouti's space-time block code is found in "A Simple Transmitter Diversity Scheme for Wireless Communications", IEEE Journal on Selected Area in Communications, Vol. 16, pp. 1451-1458, October 1998.

Figure 1:
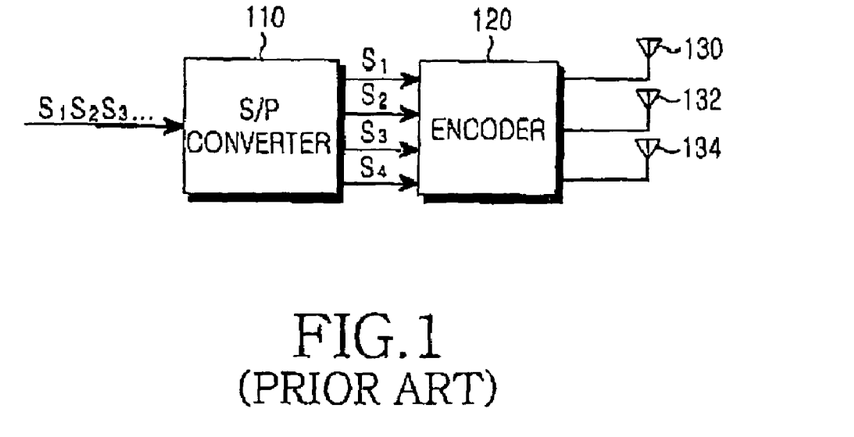
FIG. 1 is a block diagram of a conventional transmitter using a space-time block code.

FIG. 1 is a block diagram of a conventional transmitter using a space-time block code as proposed by Tarokh. Referring to FIG. 1, the transmitter includes a serial-to-parallel (S/P) converter 110 and an encoder 120. It is assumed here that the transmitter uses three transmitter antennas 130, 132 and 134.

In operation, the S/P converter 110 provides the four symbols in each block to the encoder 120. The encoder 120 produces eight symbol sets from the four symbols and feeds the symbol sets to the three transmitter antennas 130, 132 and 134 over eight time intervals. The eight symbol sets can be expressed as shown in matrix (1):

$$g_3 = \begin{bmatrix} s_1 & s_2 & s_3 \\ -s_1 & s_1 & -s_4 \\ -s_3 & s_4 & s_1 \\ -s_4 & -s_3 & s_2 \\ s_1^* & s_2^* & s_3^* \\ -s_2^* & s_1^* & -s_4^* \\ -s_3^* & s_4^* & s_1^* \\ s_4^* & s_3^* & s_2^* \end{bmatrix} \quad (1)$$

where $g_3$ is an 8×3 coding matrix of symbols transmitted through the three transmitter antennas and $s_1, s_2, s_3, s_4$ are four input symbols to be transmitted.

As shown above, the encoder 120 outputs eight symbol sets produced from the four input symbols and their negatives and conjugates to the three transmitter antennas 130, 132 and 134 for eight time intervals. Notably, symbol sequences for the transmitter antennas, that is, rows, are orthogonal to each other.

More specifically, the first three symbols $s_1, s_2, s_3$ are provided to the three antennas 130, 132 and 134, respectively for a first time interval. In the same manner, the last three symbols $s_4^*, s_3^*, s_2^*$ are provided to the antennas 130, 132 and 134, respectively for the last time interval. That is, the encoder 120 sequentially provides symbols in an $m^{th}$ column of the coding matrix to an $m^{th}$ antenna.

Figure 2:
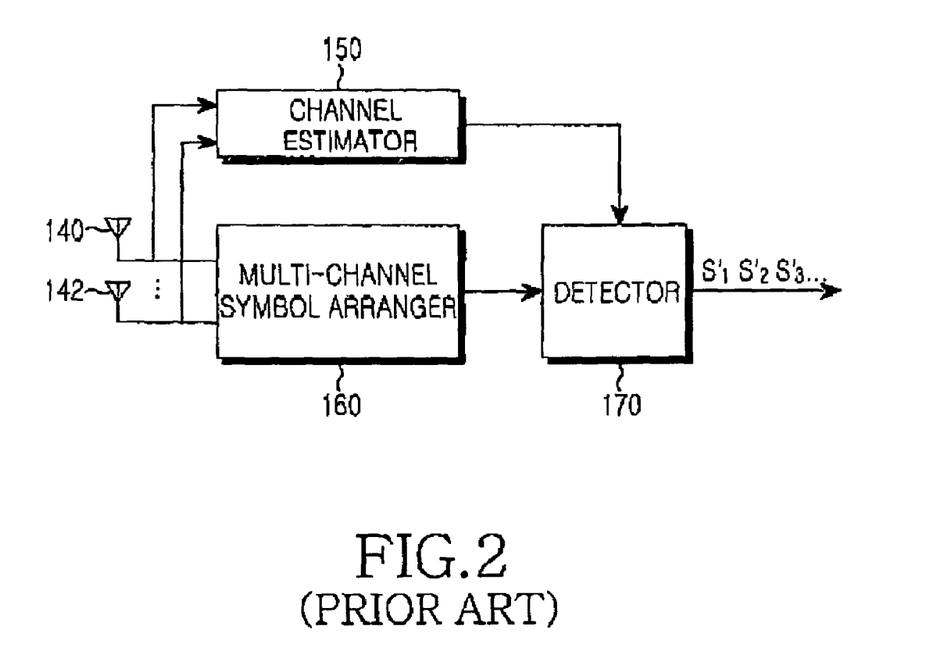
FIG. 2 is a block diagram of a receiver for receiving signals from the transmitter illustrated in FIG. 1.

FIG. 2 is a block diagram of a receiver for receiving signals from the transmitter illustrated in FIG. 1. Referring to FIG. 2, the receiver includes a plurality of receiver antennas 140 to 142, a channel estimator 150, a multi-channel symbol arranger 160, and a detector 170.

In operation, the channel estimator 150 estimates channel coefficients representing channel gains from the transmitter antennas to the receiver antennas. The multi-channel symbol arranger 160 collects symbols from the receiver antennas 140 to 142. The detector 170 then obtains hypotheses by multiplying the received symbols by the channel coefficients, calculates a decision statistic for all possible symbols using the hypotheses, and detects transmission symbols by threshold detection.

Alamouti's space-time coding achieves a maximum diversity order, that is, a diversity order identical to the number of transmitter antennas without data rate loss despite transmission of complex symbols through two transmitter antennas. This is expanded by Tarokh's space-time coding implemented in the transmitter and receiver illustrated in FIGS. 1 and 2. According to this scheme, a maximum diversity order is achieved using space-time block codes in the form of a matrix having orthogonal rows. The transmission of four complex symbols for eight time intervals, however, leads to decreasing the data rate by half. Since eight time intervals are taken to transmit one whole block (i.e. four symbols), reception performance is degraded due to the change of channel environment for the block in the case of fast fading.

As described above, when transmitting complex symbols through three or more antennas using conventional space-time block coding, 2N time intervals are required to transmit N symbols, resulting in a data rate loss. Therefore, transmission latency is lengthened and data rate is lowered.

SUMMARY OF THE INVENTION

It is, therefore, an object of the present invention to provide a receiving apparatus for achieving a maximum diversity order and a maximum data rate without a data rate loss in a mobile communication system using at least three transmitter antennas.

It is another object of the present invention to provide a receiving apparatus for increasing symbol processing speed by reducing reception complexity in a mobile communication system using at least three transmitter antennas.

The above objects are achieved by a receiver for receiving complex symbols in a radio communication system. In the receiver, at least one receiver antenna receives signals from at least three transmitter antennas and a symbol arranger collects the signals from the receiver antenna for four time intervals. A channel estimator estimates at least three channel gains from the at least three transmitter antennas to the at least one receiver antenna. The first and second decoders compute metrics for all possible pairs of symbols using the received signals and the channel gains, and each detects a pair of symbols giving a minimum metric. A parallel-to-serial converter arranges the four symbols detected by the first and second decoders in the right order. According to the present invention, the first and second decoders linearly operate the received signals with the channel gains, pre-detects two symbols using threshold detection, and output the pre-detected two symbols as final symbols if the product of the product of the pre-detected symbols and a constant determined by the channel gains is a minimum.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

For input of four symbols, symbols transmitted through three antennas for four time intervals are expressed as shown in matrix (2):

$$C_{43} = \begin{bmatrix} s_1 & s_2 & s_3 \\ s_4 & s_5 & s_6 \\ s_7 & s_8 & s_9 \\ s_{10} & s_{11} & s_{12} \end{bmatrix} \quad (2)$$

As is known, a receiver adopting ML (Maximum Likelihood) decoding computes metrics between a received signal and all possible symbols using channel estimates representing channel gains from transmitter antennas to receiver antennas, and detects a symbol giving a minimum metric.

Let a channel estimate from an $i^{th}$ transmitter antenna to a receiver antenna receiving the symbols of matrix (2) be $h_i$. A metric for an arbitrary symbol set $c_t$ is computed as shown in formula (3):

$$\sum_{t=1}^{4} \left| r_t - \sum_{i=1}^{3} h_i c_i \right|^2 \quad (3)$$

where $r_t$ is a signal received for a $t^{th}$ time interval and $c_t$ is a symbol set for the $t^{th}$ time interval. By applying formula (3) to matrix (2), the receiver selects a symbol set that minimizes formula (4):

$$|r_1 - h_1 s_1 - h_2 s_2 - h_3 s_3|^2 + |r_2 - h_1 s_4 - h_2 s_5 - h_3 s_6|^2$$
$$+ |r_3 - h_1 s_7 - h_2 s_8 - h_3 s_9|^2 + |r_4 - h_1 s_{10} - h_2 s_{11} - h_3 s_{12}|^2 \quad (4)$$

where $r_1$, $r_2$, $r_3$, $r_4$ are signals received over four time intervals and $h_1$, $h_2$, $h_3$ are channel gains representing channel coefficients from transmitter antennas to receiver antennas.

To simplify the ML decoding design for the receiver, symbol sequences transmitted through the transmitter antennas must be made orthogonal to each other by eliminating as many crossover terms as possible from formula (4). The crossover terms are expressed as shown in Equation (5):

$$h_1 h_2^* C_1 + h_2 h_3^* C_2 + h_1 h_3^* C_3 =$$
$$h_1 h_2^* (s_1 s_2^* + s_4 s_5^* + s_7 s_8^* + s_{10} s_{11}^*) + h_2 h_3^* (s_2 s_3^* + s_5 s_6^* + s_8 s_9^* + s_{11} s_{12}^*) + h_1 h_3^* (s_1 s_3^* + s_4 s_6^* + s_7 s_9^* + s_{10} s_{12}^*) \quad (5)$$

As known from Tarokh, some crossover terms involved with ML detecting cannot be eliminated when transmitting four symbols using a 4×3 coding matrix. Nevertheless, it is possible to construct orthogonality between symbol sequences transmitted by a first antenna $h_1$ and a third antenna $h_3$ by eliminating two terms in Eq. (5), that is, $C_1$ and $C_2$.

To achieve a maximum diversity order, four symbols to be transmitted must appear once in each antenna for each time interval. The following four 4×3 coding matrices satisfy this condition. Further coding matrices can be produced by replacing columns or rows in the four matrices, as in matrices (6):

$$\begin{bmatrix} s_1 & s_2 & s_3 \\ s_2 & s_1 & s_4 \\ s_3 & s_4 & s_1 \\ s_4 & s_3 & s_2 \end{bmatrix} \begin{bmatrix} s_1 & s_2 & s_3 \\ s_2 & s_1 & s_4 \\ s_3 & s_4 & s_2 \\ s_4 & s_3 & s_1 \end{bmatrix} \begin{bmatrix} s_1 & s_2 & s_3 \\ s_2 & s_3 & s_4 \\ s_3 & s_4 & s_1 \\ s_4 & s_1 & s_2 \end{bmatrix} \begin{bmatrix} s_1 & s_2 & s_3 \\ s_2 & s_4 & s_1 \\ s_3 & s_1 & s_4 \\ s_4 & s_3 & s_2 \end{bmatrix} \quad (6)$$

An example of a coding matrix having negatives and conjugates to eliminate at least two crossover terms, that is, $C_1$ and $C_2$ in Equation (5), in relation to coding matrices (6) can be represented as in matrix (7):

$$\begin{bmatrix} s_1 & s_2 & s_4 \\ -s_2^* & s_1^* & s_3^* \\ -s_4^* & -s_3^* & s_1^* \\ s_3 & -s_4 & s_2 \end{bmatrix} \quad (7)$$

And examples of available coding matrices include those shown in matrices (8):

$$\begin{bmatrix} x_1 & x_2 & -x_3^* \\ -x_2^* & x_1^* & x_4 \\ x_3 & x_4 & x_1^* \\ -x_4^* & x_3^* & -x_2 \end{bmatrix} \begin{bmatrix} x_1 & x_2 & -x_3^* \\ -x_2^* & x_1^* & -x_4 \\ x_3 & x_4 & x_1^* \\ -x_4^* & x_3^* & x_2 \end{bmatrix} \begin{bmatrix} x_1 & x_2 & x_3^* \\ -x_2^* & x_1^* & x_4 \\ x_3 & x_4 & -x_1^* \\ -x_4^* & x_3^* & -x_2 \end{bmatrix} \quad (8)$$

$$\begin{bmatrix} x_1 & x_2 & x_3^* \\ -x_2^* & x_1^* & -x_4 \\ x_3 & x_4 & -x_1^* \\ -x_4^* & x_3^* & x_2 \end{bmatrix} \begin{bmatrix} x_1 & x_2 & -x_3^* \\ -x_2^* & x_1^* & x_4 \\ x_3 & x_4 & x_1^* \\ x_4^* & -x_3^* & x_2 \end{bmatrix} \begin{bmatrix} x_1 & x_2 & x_3^* \\ -x_2^* & x_1^* & x_4 \\ x_3 & x_4 & -x_1^* \\ -x_4^* & x_3^* & x_2 \end{bmatrix}$$

$$\begin{bmatrix} x_1 & x_2 & -x_3^* \\ x_2^* & -x_1^* & x_4 \\ x_3 & x_4 & x_1^* \\ -x_4^* & x_3^* & x_2 \end{bmatrix} \begin{bmatrix} x_1 & x_2 & x_3^* \\ x_2^* & -x_1^* & x_4 \\ x_3 & x_4 & -x_1^* \\ -x_4^* & x_3^* & x_2 \end{bmatrix} \begin{bmatrix} x_1 & x_2 & -x_3^* \\ x_2^* & -x_1^* & -x_4 \\ x_3 & x_4 & x_1^* \\ x_4^* & -x_3^* & x_2 \end{bmatrix}$$

$$\begin{bmatrix} x_1 & x_2 & -x_3^* \\ x_2^* & -x_1^* & x_4 \\ x_3 & x_4 & x_1^* \\ x_4^* & -x_3^* & -x_2 \end{bmatrix} \begin{bmatrix} x_1 & x_2 & x_3^* \\ x_2^* & -x_1^* & -x_4 \\ x_3 & x_4 & -x_1^* \\ x_4^* & -x_3^* & x_2 \end{bmatrix} \begin{bmatrix} x_1 & x_2 & x_3^* \\ x_2^* & -x_1^* & x_4 \\ x_3 & x_4 & -x_1^* \\ x_4^* & -x_3^* & -x_2 \end{bmatrix}$$

Here, $x_1$, $x_2$, $x_3$, $x_4$ correspond to negatives and conjugates of $s_1$, $s_2$, $s_3$, $s_4$. Specifically, the second matrix in matrices (8) is produced from matrix (7) by $x_1=s_1$, $x_2=s_2$, $x_3=-s_4^*$, $x_4=-s_3^*$.

The ML detecting design in the receiver is simplified by eliminating at least two crossover terms, i.e. $C_1$ and $C_2$, using such coding matrices as those in matrices (8). For example, by representing formula (4) using matrix (7), minimization of formula (4) is equivalent to minimization of the following formulas (9) and (10). This is possible because the metrics expressed as formula (9) and formula (10) are independent of each other.

$$\text{Min}(x_1,x_3)(|R_1-x_1|^2+|R_3-x_3|^2+2(C_1+C_3)\text{Re}\{x_1^*x_3\}) \quad (9)$$

$$\text{Min}(x_2,x_4)(|R_2-x_2|^2+|R_4-x_4|^2+2(C_2+C_4)\text{Re}\{x_1^*x_4\}) \quad (10)$$

where Min(a,b)y(a,b)) is an operation of deciding a and b that minimize y(a,b) and Re { } is an operation of obtaining a real number component from a complex number in { }. As described before, $C_1$ and $C_2$ are zero. $C_3=h_3^*h_2-h_3h_2^*$ and $C_4=h_3h_2^*-h_3^*h_2$. $R_1=r_1h_1^*+r_2^*h_2+r_3^*h_3$, $R_2=r_1h_2^*-r_2^*h_1+r_4h_3^*$, $R_3=r_2^*h_3+r_4h_1^*-r_3^*h_2$, and $R_4=r_1h_3^*-r_3^*h_1-r_4h_2^*$.

The receiver decouples a decoding part for decoding a pair of $s_1$ and $s_3$ according to formula (9) and a decoding part for decoding a pair of $s_2$ and $s_4$ according to formula (10). As a result, the receiver structure is simplified.

The coding matrix in the case of BPSK (Binary Phase Shift Keying) symbols has a diversity order of 3. In the case of symbol mapping with a 3 or higher order such as QPSK (Quadrature Phase Shift Keying), 8PSK (8ary PSK), or 16PSK (16ary PSK), the diversity order falls to 2 because complex symbols are transmitted. Therefore, two symbols used to decide different metrics among four symbols are phase-rotated by a predetermined value, to thereby achieve a maximum diversity order of 3 in the present invention. Final symbols transmitted through the three antennas are then expressed as in matrix (11):

$$\begin{bmatrix} e^{j\theta_1}s_1 & s_2 & e^{j\theta_4}s_4 \\ -s_2^* & e^{-j\theta_1}s_1^* & s_3^* \\ -e^{-j\theta_4}s_4^* & -s_3^* & e^{-j\theta_1}s_1^* \\ s_3 & -e^{-j\theta_4}s_4 & s_2 \end{bmatrix} \quad (11)$$

This coding matrix includes symbols produced by rotating the phases of $s_1$ and $s_4$ in the matrix (7) by $\theta_1$ and $\theta_4$, respectively. Symbols related with different metrics, $s_1$ and $s_2$, $s_3$ and $s_4$, or $s_2$ and $s_3$ can also be phase-rotated. The diversity order is maintained at a maximum value, i.e. 3, irrespective of whether the two symbols are phase-rotated by different values or the same value. In the same manner, final coding matrices can be achieved by rotating the phases of two symbols determining different metrics in coding matrices (8) by a predetermined value.

Figure 3:
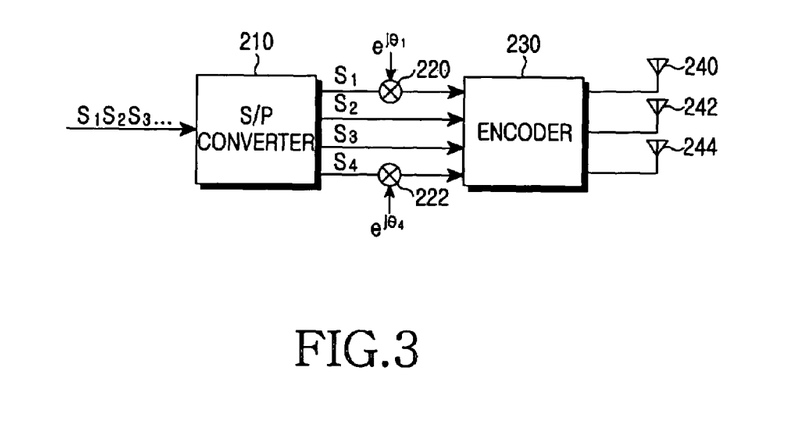
FIG. 3 is a block diagram of a transmitter using a space-time block code, to which the present invention is applied.

An exemplary transmitter using the above-described coding matrices is illustrated in FIG. 3.

FIG. 3 is a block diagram of a transmitter using space-time block coding to which the present invention is applied. As illustrated, the transmitter is comprised of an S/P converter 210, phase rotators 220 and 222, an encoder 230, and three transmitter antennas 240, 242 and 244.

Referring to FIG. 3, the S/P converter 210 provides the four symbols in each block to the encoder 230. Here, two selected symbols $s_1$ and $s_4$ are phase-rotated by the predetermined values $\theta_1$ and $\theta_4$, respectively, in the phase rotators 220 a/nd 222. Choice of the two symbols is made in the manner that they are related to various metrics in a receiver. This choice is disclosed in a Korean Patent Application No. P20030001454 by the same inventors, this application is incorporated herein by reference. The encoder 230 produces four symbol sets, each including three symbols, from the block of symbols containing the two phase-rotated symbols, and feeds them to the three transmitter antennas 240, 242 and 244 over four time intervals.

To achieve a maximum diversity order, the encoder 230 builds the symbol sets so that the four complex symbols are transmitted once from each antenna and once for each time interval. Also, the encoder 230 derives the negatives and conjugates of the input symbols for the symbol sets, in order to construct orthogonality of symbol sequences for the transmitter antennas. The reason for rotating the phases of the selected two input symbols is to achieve the maximum diversity order even in the case where the input symbols are complex.

If the four symbol sets to be transmitted through the three antennas are represented as a 4×3 matrix, symbols in an $m^{th}$ column are sequentially provided to an $m^{th}$ antenna. In other words, symbols in an $n^{th}$ row are provided simultaneously to the three antennas, for transmission in an $n^{th}$ time interval.

For example, if $s_1$ and $s_4$ among $s_1$, $s_2$, $s_3$, $s_4$ are phase-rotated by $\theta_1$ and $\theta_4$, respectively, the outputs of the encoder 230 can be expressed as a 4×3 coding matrix such as matrix (11). If coding matrix (11) is used, the three symbols $e^{j\Theta_1}s_1$, $s_2$, and $e^{j\Theta_4}s_4$ in the first row are fed to the three antennas 240, 242 and 244 for the first time interval, and the three symbols $s_3$, $e^{j\Theta_4}s_4$, and $s_2$ in the fourth row are fed to the three antennas 240, 242 and 244 for the fourth time interval.

Figure 4:
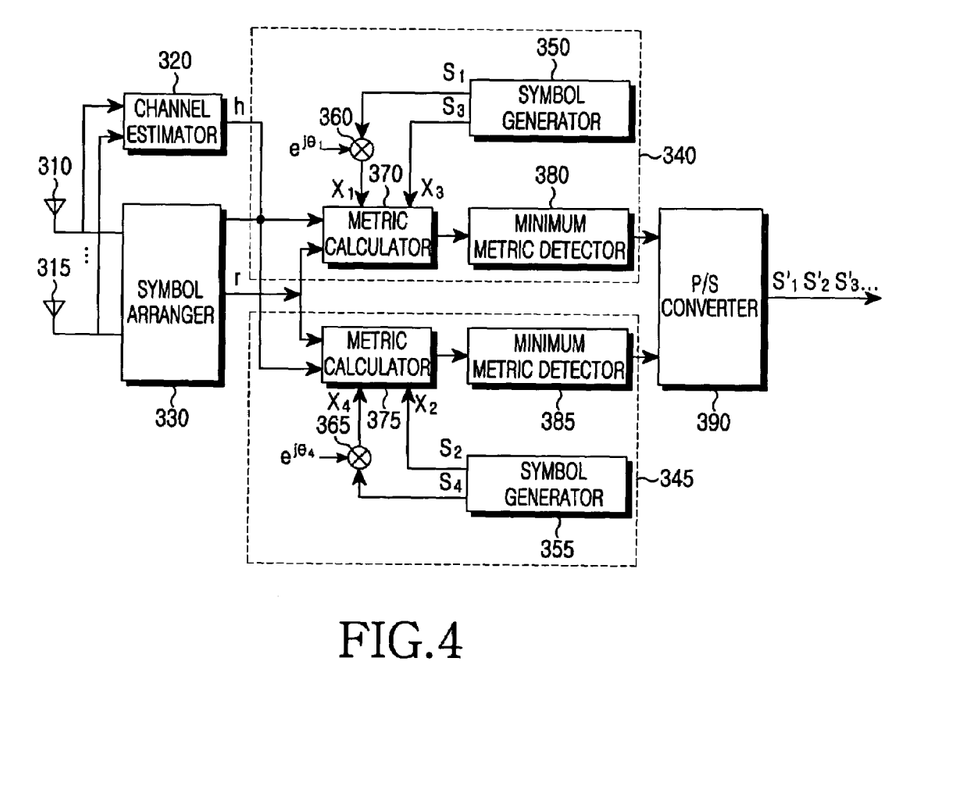
FIG. 4 is a block diagram of a receiver for receiving signals from the transmitter illustrated in FIG. 3.

FIG. 4 is a block diagram of a receiver for receiving signals from the transmitter illustrated in FIG. 4. According to an embodiment of the present invention, the receiver includes two independent ML decoders 340 and 345.

Referring to FIG. 4, a channel estimator 320 estimates channel coefficients, namely, channel gains $h_1$, $h_2$, $h_3$ from the three transmitter antennas 240, 242 and 244 to receiver antennas 310 to 315. A symbol arranger 330 collects signals $r_1$, $r_2$, $r_3$ $r_4$ received at the receiver antennas 310 to 315.

If a single receiver antenna is used, the symbol arranger 330 builds one block from the four received signals $r_1$, $r_2$, $r_3$ $r_4$. If two or more receiver antennas are used, the symbol arranger 330 builds a block in the form of a matrix from the received signals. In the matrix, the columns correspond to the receiver antennas and the rows correspond to time intervals. While a plurality of received antennas 310 to 315 is shown, the operation of the receiver will be described below in the context of a single receiver antenna for notational simplicity.

To recover the four symbols $s_1$, $s_2$, $s_3$, $s_4$ transmitted from the transmitter, the first decoder 340 detects $s_1$ and $s_3$ using the channel gains and the received signals, and the second decoder 345 detects $s_2$ and $s_4$ in the same manner. Thus, the four symbols are simultaneously detected in the decoders 340 and 345. To distinguish the detected symbols from the original symbols, the former is represented as s'.

In the case of coding matrix (11), a symbol generator 350 of the first decoder 340 generates all available sub-combinations of $s_1$ and $s_3$, and a phase rotator 352 phase-rotates s1 by the value $\theta_1$ used in the transmitter and thus outputs $e^{j\Theta_1}s_1$.

A metric calculator 370 computes metrics for all available symbol sub-combinations, each containing one phase-rotated symbol, using formula (9) on the channel gains $h_1$, $h_2$, $h_3$ and the received signals $r_1$, $r_2$, $r_3$ $r_4$. A minimum metric detector 380 then detects symbols $s_1'$ and $s_3'$ that give a minimum metric.

The second decoder 345 operates in the same manner on $s_2$ and $s_4$. After the first decoder 340 detects $s_1'$ and $s_3'$ and the second decoder 345 detects $s_2'$ and $s_4'$, a parallel-to-serial (P/S) converter 390 arranges the detected symbols in the right order and outputs a symbol set, $s_1'$, $s_2'$, $s_3'$, $s_4'$.

When the thus-constituted receiver illustrated in FIG. 4 uses a QPSK signal constellation, 16 sub-combinations of $s_1$ and $s_3$ and 16 sub-combinations of $s_2$ and $s_4$ are available. To detect desired symbols, the metric calculators 370 and 375 must compute formulas (9) and (10), each 32 times. Computation of one metric takes one complex multiplication (equivalent to four real number multiplications), one real number multiplication, four additions (subtractions), two norm operations (equivalent to two real number multiplications), and one comparison. In other words, it requires a total of seven real number multiplications and four additions. Thus, it can be said that decoding one block (two symbol sub-combinations) with respect to 32 sub-combinations requires a total of 224 real number multiplications, 128 additions, and 32 comparisons.

Repetition of this volume of computation each time four symbols are received imposes a great constraint on high-speed data service. In the present invention, therefore, the computation requirement for the receiver with respect to three transmitter antennas is reduced to thereby allow the receiver to receive symbol data at a high rate.

As described before, the receiver communicating with the three transmitter antennas detects four symbols that minimize formulas (9) and (10). Because $C_1$ and $C_2$ are zero, formulas (9) and (10) can be expressed as formulas (12) and (13), respectively:

$$|R_1-x_1|^2+|R_3-x_3|^2+2(C_3)\mathrm{Re}\{x_1^*x_3\} \qquad (12)$$

and $$|R_2-x_1|^2+|R_4-x_4|^2+2(C_4)\mathrm{Re}\{x_2^*x_4\} \qquad (13)$$

where $x_1$, $x_2$, $x_3$, $x_4$ are four symbols containing two phase-rotated symbols. That is, $x_1=e^{j\Theta_1}s_1$, $x_2=s_2$, $x_3=s_3$, $x_4=e^{j\Theta_{4}}s_4$.

Figure 6:
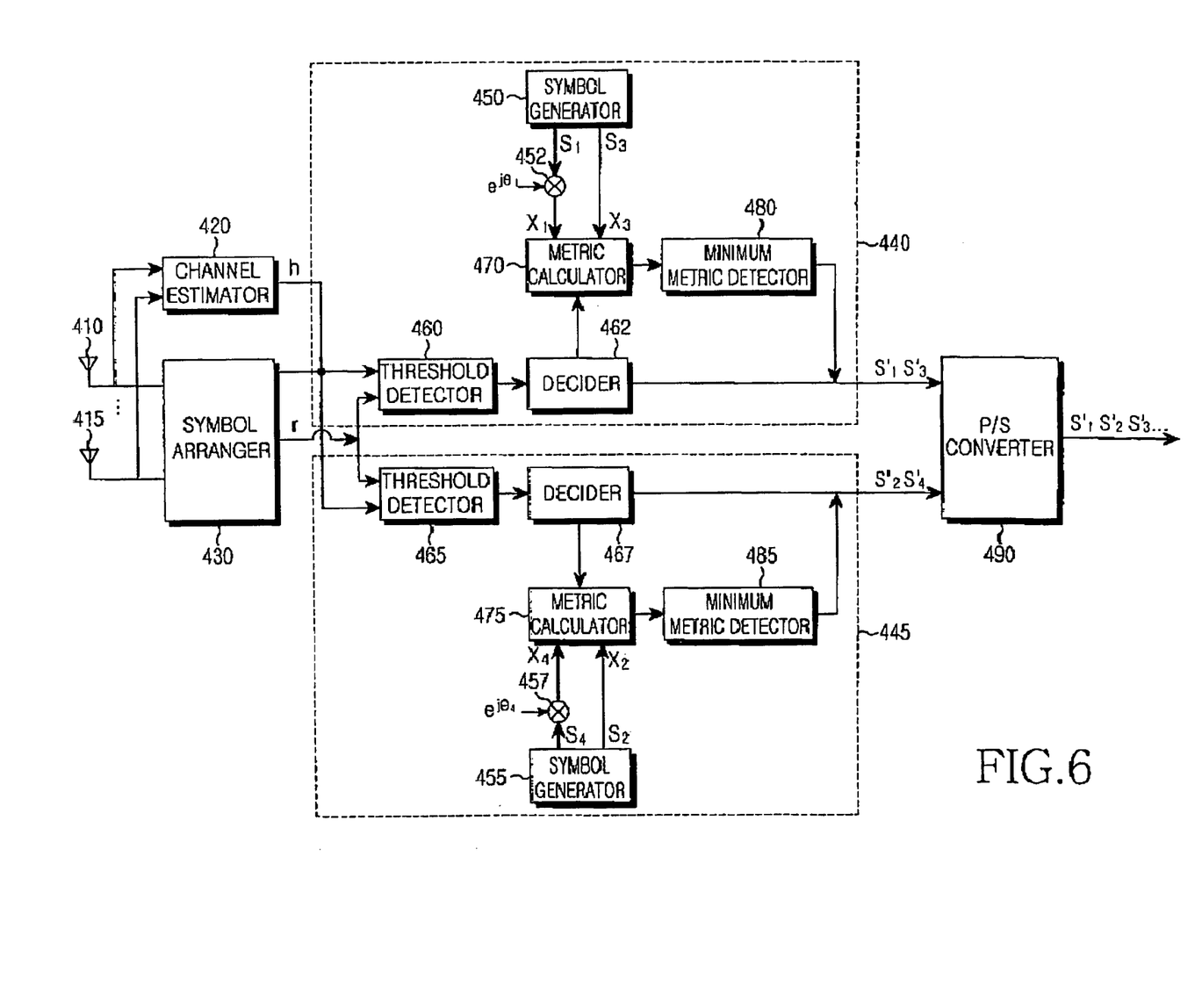
FIG. 6 is a block diagram of a receiver using a space-time block code according to the present invention.

A receiver based on the above principle according to another embodiment of the present invention is illustrated in FIG. 6. The receiver also includes two independent ML decoders 440 and 445.

Referring to FIG. 6, a channel estimator 420 estimates channel coefficients, namely, channel gains $h_1$, $h_2$, $h_3$ from the three transmitter antennas 240, 242 and 244 to receiver antennas 410 to 415. A symbol arranger 430 collects signals $r_1$, $r_2$, $r_3$, $r_4$ received at the receiver antennas 310 to 315 over four time intervals.

If a single receiver antenna is used, the symbol arranger 430 collects the received signals $r_1$, $r_2$, $r_3$ $r_4$ through the single antenna because the transmitter transmits one block of symbols for four time intervals. If two or more receiver antennas are used, the symbol arranger 330 builds a block in the form of a matrix from the received signals. In the matrix, the columns correspond to the receiver antennas and the rows correspond to the time intervals. While a plurality of received antennas 410 to 415 is shown, the operation of the receiver will be described below in the context of a single receiver antenna for notational simplicity.

To recover the four symbols $s_1$, $s_2$, $s_3$, $s_4$ transmitted from the transmitter, the first decoder 440 detects $s_1$ and $s_3$ using the channel gains and the received signals, and the second decoder 445 detects $s_2$ and $s_4$ in the same manner. Thus, the four symbols are simultaneously detected in the decoders 440 and 445. To distinguish the detected symbols from the original symbols, the former is represented as s'.

In the case of coding matrix (11), a symbol generator 450 of the first decoder 440 generates all available sub-combinations of $s_1$ and $s_3$, and a phase rotator 452 phase-rotates s1 by the value $\theta_1$ used in the transmitter and thus outputs $e^{j\Theta_1}s_1$. $e^{j\Theta_1}s_1$ and $s_3$ are referred to as a symbol sub-set. All available symbol sub-sets generated from the symbol generator 450 and the phase rotator 452 are fed to both a threshold detector 460 and a metric calculator 470 at the same time.

The threshold detector 460 pre-detects symbols $s_1'$ and $s_3'$ that best approximate thresholds $R_1$ and $R_3$ using the channel gains $h_1$, $h_2$, $h_3$ and the received signals $r_1$, $r_2$, $r_3$, $r_4$. A decider 462 computes $(C_3)\mathrm{Re}\{e^{-j\Theta_1}s_1^*s_3\}$ using $C_3$ calculated according to the channel gains and the pre-detected $s_1'$ and $s_3'$. If the computed value is a minimum, the decider 462 outputs the pre-detected $s_1'$ and $s_3'$. At this time, the metric calculator 470 and a minimum metric detector 480 are deactivated.

If 45°-phase rotation is allowed for the QPSK signal constellation, the decider 462 can determine whether $(C_3)\mathrm{Re}\{e^{-j\Theta_1}s_1^*s_3\}$ is a minimum by simply checking its sign. If it is negative-signed, the decider 462 outputs the pre-detected symbols as final symbols, and the metric calculator 470 and the minimum metric detector 480 are deactivated.

Figure 5:
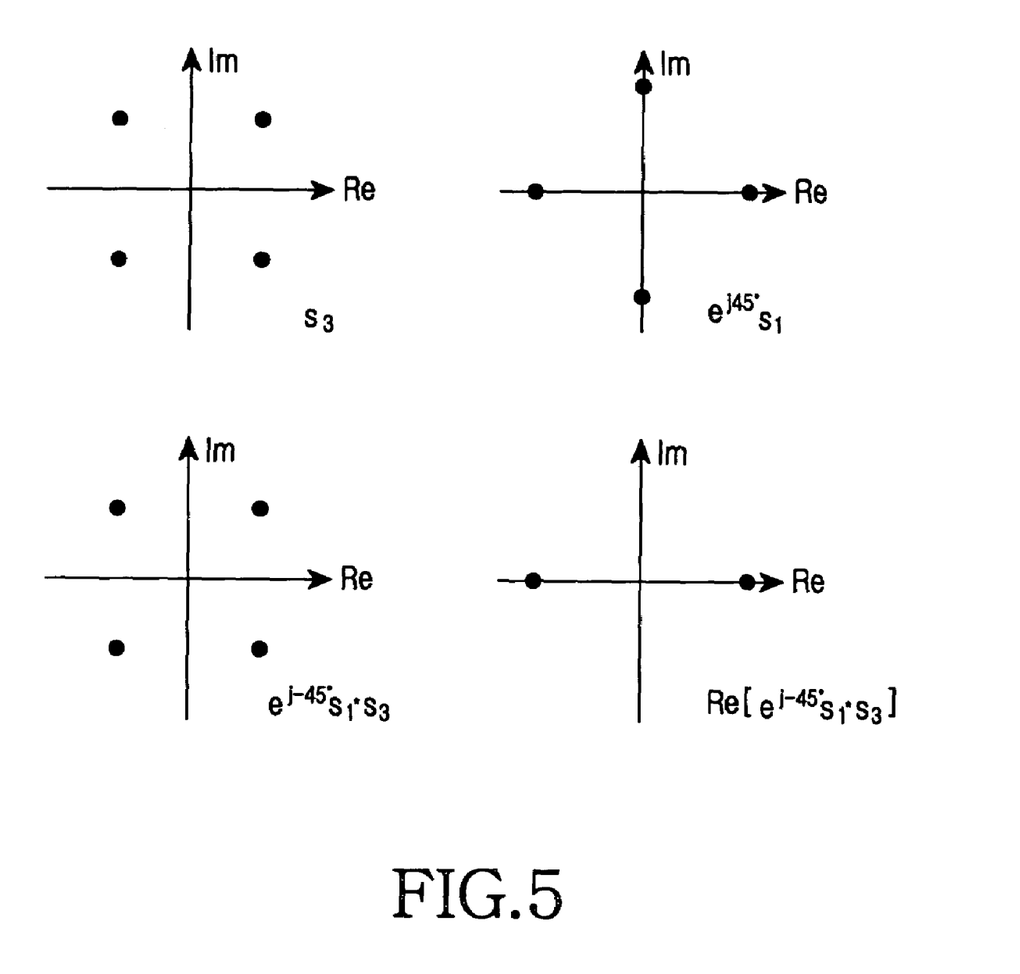
FIG. 5 illustrates QPSK symbols required to compute formula (12)

FIG. 5 illustrates symbols needed to compute formula (12) in a QPSK signal constellation. As illustrated, the last term $(C_3)\mathrm{Re}\{e^{-j\Theta_1}s_1^*s_3\}$ in formula (12) is $+C_3$ or $-C_3$. If the term is negative-signed, detection of $s_1$ and $s_3$ that minimize formula (12) is equivalent to detection of $s_1$ that minimizes the first term $|R_1-e^{j\Theta_1}s_1|^2$ of formula (12) and $s_3$ that minimizes the second term $|R_3-s_3|^2$ of formula 12. The same thing occurs with respect to formula (13) and $s_2$ and $s_4$. The minimizations of $|R_1-e^{j\Theta_1}s_1|^2$ and $|R_3-s_3|^2$ are equivalent to determinations of $s_1$ and $s_3$ that best approximate the thresholds $R_1$ and $R_3$, that is, threshold detection.

If the value computed by the decider is not a minimum, the metric calculator 470 computes metrics for all available symbol sub-sets using formula (12) on $R_1$, $R_3$, and $C_3$ which are obtained using the channel gains and the received signals. The metric calculator 470 may compute $R_1$, $R_3$, and $C_3$ directly, or receive them from the threshold detector 460. In the latter case, the decider 462 feeds $R_1$, $R_3$, and $C_3$ to the metric calculator 479 for symbol detection if the computed value is not a minimum. The minimum metric detector 480 then detects $s_1'$ and $s_3'$ that give the minimum metric.

The second decoder 445 operates in the same manner. After the first decoder 440 detects $s_1'$ and $s_3'$ and the second decoder 445 detects $s_2'$ and $s_4'$, a P/S converter 490 arranges the detected symbols in the right order and outputs a symbol set $s_1'$, $s_2'$, $s_3'$, $s_4'$.

In the receiver illustrated in FIG. 6, one decoder carries out one complex multiplication (equivalent to four real number multiplications), one real number multiplication, and three minimum value decisions. Because the minimum value computation is a comparison with a pre-stored minimum value, five real number multiplications and three comparisons are eventually required. The probability of the sign being negative is ½ for QPSK. Hence, 122 real number multiplications, 64 real number additions, and 22 comparisons on the average are required for every pair of symbols. It is apparent from Table 1 that the receiver illustrated in FIG. 6 requires half the computational complexity of the receiver illustrated in FIG. 4.

TABLE 1

| | Real number multiplication | Real number addition | Comparison |
|---|---|---|---|
| FIG. 4 | 224 | 128 | 32 |
| FIG. 6 (present invention) | 122 (112 + 10) | 64 | 22 (16 + 6) |

Figure 7:
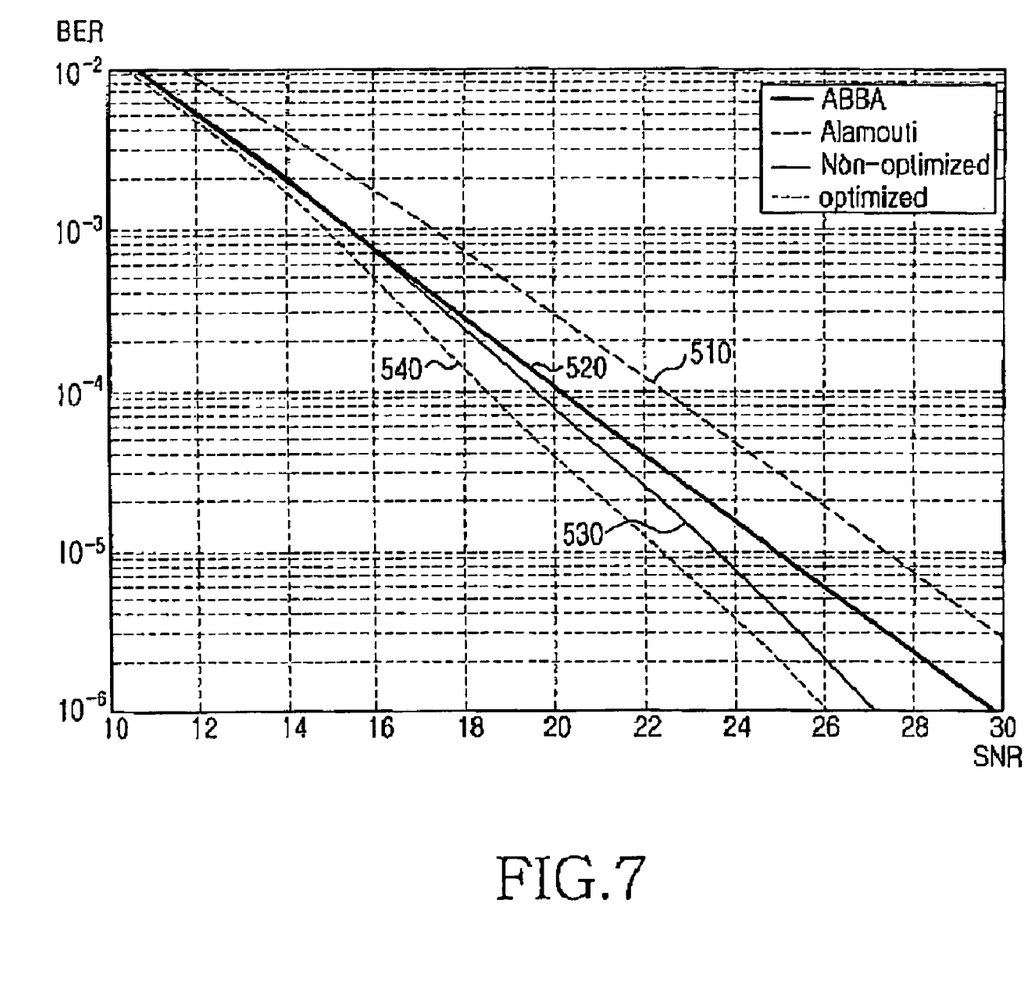
FIG. 7 is a graph comparing the block coding of the present invention with conventional block coding in terms of BER (Bit Error Rate) versus SNR (Signal-to-Noise Ratio).

FIG. 7 is a graph illustrating BER versus SNR in the conventional block coding and in the inventive block coding. Referring to FIG. 7, reference numeral 510 denotes the efficiency of Alamouti's space-time block coding using two antennas, reference numeral 520 denotes the efficiency of Tarokh's space-time block coding using an 8×3 coding matrix with orthogonal rows, reference numeral 530 denotes the efficiency of space-time block coding using a 4×3 coding matrix with non-optimized phase values, and reference numeral 540 denotes the efficiency of space-time block coding using a 4×3 coding matrix with optimized phase values according to the present invention. As noted, the inventive block code with optimized phase values has the lowest BER for a given SNR.

While the present invention has been described in the context of three transmitter antennas, it is obvious that the receiver illustrated in FIG. 6 is applicable to a transmitter/receiver for transmitting and receiving phase-rotated symbols to and from three or more transmitter antennas. For example, a coding matrix for four transmit antennas can be represented as in matrix (14):

$$\begin{matrix} e^{j\theta_1}s_1 & s_2 & s_3^* & -e^{-j\theta_1}s_4^* \\ s_2^* & -e^{-j\theta_1}s_1^* & e^{j\theta_1}s_4 & -s_3 \\ s_3 & e^{j\theta_1}s_4 & -e^{-j\theta_1}s_1^* & -s_2^* \\ e^{-j\theta_1}s_4^* & -s_3^* & -s_2 & e^{j\theta_1}s_1 \end{matrix} \quad (14)$$

When coding matrix (14) is used, the metric calculators 370 and 375 in the decoders 440 and 445 illustrated in FIG. 4 detect symbols that minimize formulas (15) and (16) as follows:

$$\text{Min}_{(x_1,x_3)}(|R_1-x_1|^2+|R_3-x_3|^2+|R_{13}-x_1^*x_3|^2-|x_1|^2|x_3|^2) \quad (15)$$

and $$\text{Min}_{(x_2,x_4)}(|R_2-x_2|^2+|R_4-x_4|^2+|R_{24}-x_2^*x_4|^2-|x_2|^2|x_4|^2) \quad (16)$$

where $R_1$, $R_3$, $R_{13}$, $R_2$, $R_4$, $R_{24}$ are defined as shown in Equation (17):

$$R_1 = \frac{(r_1 h_1^* + r_2^* h_2 + r_3^* h_3 - r_4 h_4^*)}{K},$$

$$R_3 = \frac{(r_1 h_4^* + r_2^* h_3 - r_3^* h_2 + r_4 h_1^*)}{K}$$

$$R_{13} = \frac{(-h_1 h_4^* + h_1^* h_4 - h_2^* h_3 + h_2 h_3^*)}{K},$$

$$R_2 = \frac{(r_1 h_2^* - r_2^* h_1 + r_3^* h_4 + r_4 h_3^*)}{K}$$

$$R_4 = \frac{(r_1 h_3^* - r_2^* h_4 - r_3^* h_1 - r_4 h_2^*)}{K},$$

$$R_{24} = \frac{(-h_2 h_3^* - h_1^* h_4 + h_4^* h_1 + h_3 h_2^*)}{K}$$

$$K = |h_1|^2 + |h_2|^2 + |h_3|^2 + |h_4|^2$$

The threshold detector 460 pre-detects symbols that approximate $R_1$ and $R_3$ and the threshold detector 465 pre-detects symbols that approximate $R_2$ and $R_4$. The deciders 462 and 467 then compute whether $|R^{13}-x_1^*x_3|^2-|x_1|^2|x_3|^2$ and $|R_{24}-x_2^*x_4|^2-|x_2|^2|x_4|^2$ are minima. If they are minima, the deciders 462 and 467 output the pre-detected symbols as final symbols. The metric calculators 370 and 375 detect symbols that minimize formulas (15) and (16) only when $|R^{13}-x_1^*x_3|^2-|x_1|^2|x_3|^2$ and $|R_{24}-x_2^*x_4|^2-|x_2|^2|x_4|^2$ are not minima.

As described above, the present invention achieves a maximum diversity order without data rate loss even when complex symbols are transmitted. It also minimizes transmission latency. The resulting robustness against fast fading and simplified decoding design reduce production cost and contribute to system miniaturization.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiver for receiving complex symbols in a radio communication system, comprising:

a symbol arranger for collecting signals from at least one receiver antenna over four time intervals, the at least one receiver antenna receiving the signals from at least three transmitter antennas;

a channel estimator for estimating at least three channel gains from the at least three transmitter antennas to the at least one receiver antenna;

a first decoder for computing metrics for all possible pairs of symbols using the received signals and the channel gains, and for detecting two symbols giving a minimum metric;

a second decoder for computing metrics for all possible pairs of symbols using the received signals and the channel gains, and for detecting two symbols giving a minimum metric; and a parallel-to-serial converter for arranging the four symbols detected by the first and second decoders in the right order, wherein the first and second decoders each linearly operate the received signals with the channel gains, pre-detect two symbols using threshold detection, and output the pre-detected two symbols as final symbols if the product of the product of the pre-detected symbols and a constant determined by the channel gains is a minimum.

2. The receiver of claim 1, wherein the number of the transmitter antennas is 3.

3. The receiver of claim 2, wherein the first and second decoders each pre-detect two symbols $s_1$ and $s_3$ or $s_2$ and $s_4$, respectively, that minimize $|R_1-e^{j\theta_1}s_1|^2+|R_3-s_3|^2$ or $|R_2-s_2|^2+|R_4-e^{j\theta_4}s_4|^2$, respectively, where $\theta_1$ and $\theta_4$ are phase rotation values used in a transmitter, $$R_1=r_1h_1^*+r_2^*h_2+r_3^*h_3,\ R_3=r_2^*h_3+r_4h_1^*+-r_3^*h_2,$$

$$R_2=r_1h_2^*-r_2^*h_1+r_4h_3^*,\ R_4=r_1h_3^*-r_3^*h_1-r_4h_2^*,$$

$r_1$, $r_2$, $r_3$ and $r_4$ are the signals received over the four time intervals, and $h_1$, $h_2$, and $h_3$ are the channel gains of the three antennas.

4. The receiver of claim 3, wherein the first and second decoders output the pre-detected symbols as final symbols if $(C_3)\text{Re}\{e^{-j\theta_1}s_1^*s_3\}$ or $(-C_3)\text{Re}\{s_2^*e^{j\theta_4}s_4\}$ is a minimum, where $C_3=h_3h_2^*-h_3^*h_2$ and $h_2$ and $h_3$ are the channel gains of two of the three transmitter antennas.

5. The receiver of claim 4, wherein the first and second decoders detect two symbols $s_1$ and $s_3$ or $s_2$ and $s_4$, respectively, that minimize $$|R_1-e^{j\theta_1}s_1|^2+|R_3-s_3|^2+2(C_3)\text{Re}\{e^{-j\theta_1}s_1^*s_3\}\ \text{or}$$

$$|R_2-s_2|^2+|R_4-e^{j\theta_4}s_4|^2+2(-C_3)\ \text{Re}\{s_2^*e^{j\theta_4}s_4\},$$

respectively, if $(C_3)\text{Re}\{e^{-j\theta_1}s_1^*s_3\}$ or $(-C_3)\text{Re}\{s_2^*e^{j\theta_4}s_4\}$ is not a minimum.

6. The receiver of claim 1, wherein the number of the transmitter antennas is 4.

7. The receiver of claim 6, wherein the first and second decoders each pre-detect two symbols $s_1$ and $s_3$ or $s_2$ and $s_4$, respectively, that minimize $|R_1-e^{j\theta_1}s_1|^2+|R_3-s_3|^2$ or $|R_2-s_2|^2+|R_4-e^{j\theta_4}s_4|^2$, respectively, in which $\theta_1$ and $\theta_4$ are phase rotation values used in a transmitter, and $R_1$, $R_3$, $R_2$, and $R_4$ are defined as $$R_1 = \frac{(r_1 h_1^* + r_2^* h_2 + r_3^* h_3 - r_4 h_4^*)}{K},$$

-continued $$R_3 = \frac{(r_1 h_4^* + r_2^* h_3 - r_3^* h_2 + r_4 h_1^*)}{K}$$

$$R_2 = \frac{(r_1 h_2^* - r_2^* h_1 + r_3^* h_4 + r_4 h_3^*)}{K},$$

$$R_4 = \frac{(r_1 h_3^* - r_2^* h_4 - r_3^* h_1 - r_4 h_2^*)^2}{K}$$

$$K = |h_1|^2 + |h_2|^2 + |h_3|^2 + |h_4|^2$$

where $r_1$, $r_2$, $r_3$ and $r_4$ are the signals received over the four time intervals, and $h_1$, $h_2$, $h_3$, and $h_4$ are the channel gains of the four antennas.

8. The receiver of claim 7, wherein the first and second decoders output the pre-detected symbols as final symbols if $|R_{13}-x_1^*x_3|^2-|x_1|^2|x_3|^2$ or $|R_{24}-x_2^*x_4|^2-|x_2|^2|x_4|^2$ is a minimum, where $R_{13}$ and $R_{24}$ are defined as $$R_{13} = \frac{(-h_1 h_4^* + h_1^* h_4 - h_2^* h_3 + h_2 h_3^*)}{K},$$

$$R_{24} = \frac{(-h_2 h_3^* - h_1^* h_4 + h_4^* h_1 + h_3 h_2^*)}{K}.$$

9. The receiver of claim 8, wherein the first and second decoders each detect two symbols $s_1$ and $s_3$ or $s_2$ and $s_4$, respectively, that minimize $$|R_1-x_1|^2+|R_3-x_3|^2+2(C_3)\text{Re}\{x_1^*x_3\}\ \text{or}$$

$$|R_2-x_2|^2+|R_4-x_4|^2+2(C_3)\text{Re}\{x_2^*x_4\},$$

respectively, if $|R_{13}-x_1^*x_3|^2-|x_1|^2|x_3|^2$ or $|R^{24}-x_2^*x_4|^2-|x_2|^2|x_4|^2$ is not minimum.

10. The receiver of claim 1, wherein each of the first and second decoders comprises:

a symbol generator for generating all possible symbol sub-combinations, each symbol sub-combination containing two symbols;

a phase rotator for rotating the phase of one symbol in each symbol sub-combination by a predetermined value;

a threshold detector for linearly operating the received signals with the channel gains and pre-detecting two symbols using threshold detection;

a decider for computing that the pre-detected symbols are final symbols if the product of the product of the pre-detected symbols and a constant determined by the channel gains is a minimum;

a metric calculator for computing the metrics of the symbol sub-combinations, each containing a phase-rotated symbol, using the received signals and the channel gains; and a detector for detecting two symbols having a minimum metric using the computed metrics.

11. The receiver of claim 10, wherein the number of the transmitter antennas is 3.

12. The receiver of claim 11, wherein the threshold detector pre-detects two symbols $s_1$ and $s_3$ or $s_2$ and $s_4$ that minimize $|R_1-e^{j\theta_1}s_1|^2+|R_3-s_3|^2$ or $|R_2-s_2|^2+|R_4-e^{j\theta_4}s_4|^2$ where $\theta_1$ and $\theta_4$ are phase rotation values used in a transmitter, $$R_1=r_1h_1^*+r_2^*h_2+r_3^*h_3,\ R_3=r_2^*h_3+r_4h_1^*+-r_3^*h_2,$$

$$R_2=r_1h_2^*-r_2^*h_1+r_4h_3^*,\ R_4=r_1h_3^*-r_3^*h_1-r_4h_2^*,$$

$r_1$, $r_2$, $r_3$ and $r_4$ are the signals received over the four time intervals, and $h_1$, $h_2$, and $h_3$ are the channel gains of the three antennas.

13. The receiver of claim 12, wherein the decider outputs the pre-detected symbols as final symbols if $(C_3)\text{Re}\{e^{-j\theta_1}s_1^*s_3\}$ or $(-C_3)\text{Re}\{s_2^*e^{j\theta_4}s_4\}$ is a minimum, where $C_3=h_3h_2^*-h_3^*h_2$ and $h_2$ and $h_3$ are the channel gains of two of the three transmitter antennas.

14. The receiver of claim 13, wherein the metric calculator detects two symbols $s_1$ and $s_3$ or $s_2$ and $s_4$ that minimize $$|R_1-e^{j\theta_1}s_1|^2+|R_3-s_3|^2+2(C_3)\text{Re}\{e^{-j\theta_1}s_1^*s_3\} \text{ or}$$

$$|R_2-s_2|^2+|R_4-e^{j\theta_4}s_4|^2+2(-C_3)\text{Re}\{s_2^*e^{j\theta_4}s_4\}$$

if $(C_3)\text{Re}\{e^{-j\theta_1}s_1s_3\}$ or $(-C_3)\text{Re}\{s_2e^{j\theta_4}s_4\}$ is not a minimum.

15. The receiver of claim 10, wherein the number of the transmitter antennas is 4.

16. The receiver of claim 15, wherein the threshold detector pre-detects two symbols $s_1$ and $s_3$ or $s_2$ and $s_4$ that minimize $|R_1-e^{j\theta_1}s_1|^2+|R_3-s_3|^2$ or $|R_2-s_2|^2+|R_4-e^{j\theta_4}s_4|^2$, in which $\theta_1$ and $\theta_4$ are phase rotation values used in a transmitter, and $R_1$, $R_3$, $R_2$, and $R_4$ are defined as $$R_1 = \frac{(r_1h_1^* + r_2^*h_2 + r_3^*h_3 - r_4h_4^*)}{K},$$

$$R_3 = \frac{(r_1h_4^* + r_2^*h_3 - r_3^*h_2 + r_4h_1^*)}{K}$$

$$R_2 = \frac{(r_1h_2^* - r_3^*h_1 + r_3^*h_4 + r_4h_3^*)}{K},$$

$$R_4 = \frac{(r_1h_3^* - r_2^*h_4 - r_3^*h_1 - r_4h_2^*)^2}{K}.$$

-continued $$K = |h_1|^2 + |h_2|^2 + |h_3|^2 + |h_4|^2$$

where $r_1$, $r_2$, $r_3$ and $r_4$ are the signals received over the four time intervals, and $h_1$, $h_2$, $h_3$, and $h_4$ are the channel gains of the four antennas.

17. The receiver of claim 16, wherein the decider outputs the pre-detected symbols as final symbols if $|R^{13}-x_1^*x_3|^2-|x_1|^2|x_3|^2$ or $|R_{24}-x_2^*x_4|^2-|x_2|^2|x_4|^2$ is a minimum, where $R_{13}$ and $R_{24}$ are defined as $$R_{13} = \frac{(-h_1h_4^* + h_1^*h_4 - h_2^*h_3 + h_2h_3^*)}{K},$$

$$R_{24} = \frac{(-h_2h_3^* - h_1^*h_4 + h_4^*h_1 + h_3h_2^*)}{K}.$$

18. The receiver of claim 17, wherein the metric calculator detects two symbols $s_1$ and $s_3$ or $s_2$ and $s_4$ that minimize $$|R_1-x_1|^2+|R_3-x_3|^2+2(C_3)\text{Re}\{x_1^*x_3\} \text{ or}$$

$$|R_2-x_2|^2+|R_4-x_4|^2+2(C_3)\text{Re}\{x_2^*x_4\}$$

if $|R_{13}-x_1x_3|^2-|x_1|^2|x_3|^2$ or $|R_{24}-x_2^*x_4|^2-|x_2|^2$ is not a minimum.

* * * * *